United States Patent
Meguro

(10) Patent No.: US 7,979,864 B2
(45) Date of Patent: Jul. 12, 2011

(54) APPARATUS FOR SETTING USED LICENSE OF EXECUTING JOB INTO UNUSED LICENSE STATE AND ALLOCATING THE SET UNUSED LICENSE TO A TO BE EXECUTED JOB BASED ON PRIORITY

(75) Inventor: Masakazu Meguro, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1568 days.

(21) Appl. No.: 11/285,445

(22) Filed: Nov. 22, 2005

(65) Prior Publication Data

US 2007/0039003 A1 Feb. 15, 2007

(30) Foreign Application Priority Data

Aug. 15, 2005 (JP) ................ 2005-235164

(51) Int. Cl.
- G06F 9/46 (2006.01)
- G06F 7/04 (2006.01)
- G06F 21/00 (2006.01)
- G06F 15/173 (2006.01)

(52) U.S. Cl. ........ 718/104; 718/103; 709/223; 709/224; 709/225; 709/226; 726/26; 705/58; 705/59

(58) Field of Classification Search .................. 718/102, 718/103, 104; 705/59; 709/223–226; 717/163
See application file for complete search history.

(56) References Cited

U.S. PATENT DOCUMENTS

| | | | | |
|---|---|---|---|---|
| 4,937,863 A * | 6/1990 | Robert et al. | ................ | 710/200 |
| 5,377,352 A * | 12/1994 | Tanaka et al. | ................ | 718/103 |
| 5,845,065 A * | 12/1998 | Conte et al. | ................ | 726/31 |
| 6,434,589 B1 * | 8/2002 | Lin et al. | ................ | 718/100 |
| 6,687,065 B2 * | 2/2004 | Tan et al. | ................ | 360/31 |
| 7,013,294 B1 * | 3/2006 | Sekigawa et al. | ................ | 705/59 |
| 7,228,545 B2 * | 6/2007 | Circenis et al. | ................ | 718/102 |
| 7,596,788 B1 * | 9/2009 | Shpigelman | ................ | 718/100 |
| 7,610,586 B2 * | 10/2009 | Ismail et al. | ................ | 718/104 |
| 7,620,706 B2 * | 11/2009 | Jackson | ................ | 709/223 |
| 7,685,628 B2 * | 3/2010 | Fukui et al. | ................ | 726/2 |
| 2003/0072448 A1 * | 4/2003 | Nakamura et al. | ............ | 380/243 |
| 2003/0126456 A1 * | 7/2003 | Birzer et al. | ................ | 713/193 |
| 2004/0078339 A1 * | 4/2004 | Goringe et al. | ................ | 705/59 |
| 2005/0049973 A1 * | 3/2005 | Read et al. | ................ | 705/59 |
| 2005/0131711 A1 * | 6/2005 | Bouriant et al. | ................ | 705/1 |

(Continued)

FOREIGN PATENT DOCUMENTS

JP 5-346851 12/1993

(Continued)

*Primary Examiner* — Jennifer N To

(74) *Attorney, Agent, or Firm* — Fujitsu Patent Center

(57) ABSTRACT

A job management apparatus includes a detection section that detects the number of unused licenses, a determination section that determines whether or not the number of unused licenses is sufficient to cover the number of licenses necessary for execution of a first job to be executed, and a job control section that sets a used license that is used by a second job into an unused state, in which a priority rank assigned to the second job is lower than a priority rank assigned to the first job, when the determination section determines that the number of unused licenses is not sufficient to cover the number of licenses necessary for execution of the first job, and allocates the used license set into the unused state to the first job.

14 Claims, 2 Drawing Sheets

U.S. PATENT DOCUMENTS

| | | | | |
|---|---|---|---|---|
| 2006/0064387 A1* | 3/2006 | Jose et al. | | 705/59 |
| 2007/0022425 A1* | 1/2007 | Jackson | | 718/104 |
| 2008/0243683 A1* | 10/2008 | Patel et al. | | 705/39 |
| 2008/0243699 A1* | 10/2008 | Hilerio et al. | | 705/59 |

FOREIGN PATENT DOCUMENTS

| | | |
|---|---|---|
| JP | 2001-240910 | 9/2001 |
| JP | 2003-058266 | 2/2003 |
| JP | 2003-256064 | 9/2003 |

* cited by examiner

APPARATUS FOR SETTING USED LICENSE OF EXECUTING JOB INTO UNUSED LICENSE STATE AND ALLOCATING THE SET UNUSED LICENSE TO A TO BE EXECUTED JOB BASED ON PRIORITY

BACKGROUND OF THE INVENTION

1. Field of the Invention

The present invention relates to a job management apparatus, a job management method, and a medium that has recorded therein, readable by a computer, a job management program which manage jobs being executed and to be executed, on the basis of licenses.

2. Description of the Related Art

There has been a known conventional technique which makes jobs of an application program be executable based on licenses. In case of thus executing a job on the basis of a license, the number of available (buyable) licenses is finite generally. Jobs which require a particular kind of license may concentrate at a time, and may cause a shortage in number of licenses, which makes the jobs inexecutable.

If a job is inputted while a shortage in number of licenses occurs, the job waits for execution (i.e., the job is set in a queue). This job is not executed before a necessary number of licenses become vacant after other jobs previously put in the queue are completed.

To avoid this kind of problem, various techniques concerning management of jobs executed on the bases of licenses have been disclosed (for example, Jpn. Pat. Appln. Laid-Open Publications No. 2003-256064, No. 2003-58266, No. 2001-249819, and No. 5-346851.

However, in the conventional techniques described above, the numbers of licenses are fixedly assigned to prioritized jobs and normal jobs, to such a low extent that normal jobs, which are frequently executed, hardly influence prioritized jobs. For example, in this case of fixedly assigning the numbers of licenses as described above, there has been a waste. That is, even when any slot for a job to be assigned to a normal job remains unused, this slot cannot be used for execution of a prioritized job.

If a contract of increasing the number of licenses is made, it is possible to eliminate the problem that a job to be prioritized cannot be executed. This is not preferable in view of costs.

From the above situation, in conventional job management as described above, a manager manually arranges priority ranks of plural jobs to be executed simultaneously, in order that jobs to be executed with priority should avoid waiting for completion of other jobs which are not so highly prioritized. This manual management requires skills and man hour, and places a burden on the manager.

SUMMARY OF THE INVENTION

The present invention has been made to solve problems as described above, and has an object of providing a technique capable of reducing burdens on management of jobs which are made executable based on licenses.

To achieve the above object, according to an aspect of the present invention, a job management apparatus that manages jobs being executed and to be executed, based on licenses, comprises: a detection section that detects the number of unused licenses, based on use states of licenses; a determination section that determines whether or not the number of unused licenses detected by the detection section is sufficient to cover the number of licenses necessary for execution of a job to be executed; and a job control section that sets at least such a number of licenses each into an unused state that are equivalent to a shortage of licenses for execution of the job to be executed, among licenses used by a job for which a lower priority rank has been set than a priority rank set for the job to be executed, thereby to make the job to be executed be executed, if the determination section determines that the number of unused licenses is not sufficient to cover the number of licenses necessary for execution of the job to be executed.

The job management apparatus according to the present invention may be arranged as follows. The job control section sets the licenses each into an unused state by suspending execution of a job for which a lower priority rank than the priority rank set for the job to be executed has been set.

The job management apparatus according to the present invention may be arranged as follows. If the job to be executed is completed, the job control section restarts execution of the job which has been suspended.

The job management apparatus according to the present invention may be arranged as follows. If a job for which a predetermined priority rank has been set is kept executed continuously for a predetermined time period or more, the job control section suspends execution of the job, and changes the predetermined priority rank of the job to a lower priority rank, thereby to set the job into an execution waiting state.

The job management apparatus according to the present invention may be arranged as follows. If the job for which the lower priority rank than the priority rank set for the job to be executed has been set is a kind of job which uses plural CPUs, the job control section sets the licenses each into an unused state, by reducing the number of CPUs used by the job.

According to another aspect of the present invention, a job management method that manages jobs being executed and to be executed, based on licenses, comprises: a detection step that detects the number of unused licenses, based on used states of licenses; a determination step that determines whether or not the number of unused licenses detected in the detection step is sufficient to cover the number of licenses necessary for execution of a job to be executed; and a job control step that sets at least such a number of licenses each into an unused state that are equivalent to a shortage of licenses for execution of the job to be executed, among licenses used by a job for which a lower priority rank has been set than a priority rank set for the job to be executed, thereby to make the job to be executed be executed, if the determination step determines that the number of unused licenses is not sufficient to cover the number of licenses necessary for execution of the job to be executed.

The job management method according to the present invention may be arranged as follows. The job control step sets the licenses each into an unused state by suspending execution of a job for which a lower priority rank than the priority rank set for the job to be executed has been set.

The job management method according to the present invention may be arranged as follows. If the job to be executed is completed, the job control step restarts execution of the job which has been suspended.

The job management method according to the present invention may be arranged as follows. If a job for which a predetermined priority rank has been set is kept executed continuously for a predetermined time period or more, the job control step suspends execution of the job, and changes the predetermined priority rank of the job to a lower priority rank, thereby to set the job into an execution waiting state.

The job management method according to the present invention may be arranged as follows. If the job for which the lower priority rank than the priority rank set for the job to be executed has been set is a kind of job which uses plural CPUs, the job control step sets the licenses each into an unused state, by reducing the number of CPUs used by the job.

According to still another aspect of the present invention, a job management program that makes a computer execute management of jobs being executed and to be executed, based on licenses, comprises: a detection step that detects the number of unused licenses, based on used states of licenses; a determination step that determines whether or not the number of unused licenses detected in the detection step is sufficient to cover the number of licenses necessary for execution of a job to be executed; and a job control step that sets at least such a number of licenses each into an unused state that are equivalent to a shortage of licenses for execution of the job to be executed, among licenses used by a job for which a lower priority rank has been set than a priority rank set for the job to be executed, thereby to make the job to be executed be executed, if the determination step determines that the number of unused licenses is not sufficient to cover the number of licenses necessary for execution of the job to be executed.

The job management program according to the present invention may be arranged as follows. The job control step sets the licenses each into an unused state by suspending execution of a job for which a lower priority rank than the priority rank set for the job to be executed has been set.

The job management program according to the present invention may be arranged as follows. If the job to be executed is completed, the job control step restarts execution of the job which has been suspended.

The job management program according to the present invention may be arranged as follows. If a job for which a predetermined priority rank has been set is kept executed continuously for a predetermined time period or more, the job control step suspends execution of the job, and changes the predetermined priority rank of the job to a lower priority rank, thereby to set the job into an execution waiting state.

The job management program according to the present invention may be arranged as follows. If the job for which the lower priority rank than the priority rank set for the job to be executed has been set is a kind of job which uses plural CPUs, the job control step sets the licenses each into an unused state, by reducing the number of CPUs used by the job.

As has been described above, according to the present invention, it is possible to provide a technique capable of reducing load to management of jobs which are made executable based on licenses.

DETAILED DESCRIPTION OF THE PREFERRED EMBODIMENTS

An embodiment of the present invention will now be described below with reference to the drawings.

Figure 1:
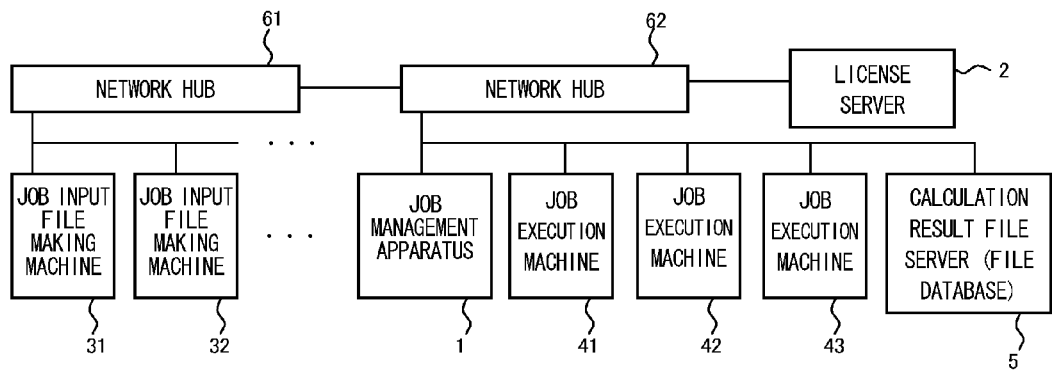
FIG. 1 shows a system configuration to explain a job management apparatus according to an embodiment of the present invention.

FIG. 1 shows a system configuration to explain a job management apparatus according to an embodiment of the present invention.

As shown in FIG. 1, a job management apparatus 1 according to the present embodiment is connected communicably to a license server 2, job input file making machines 31 and 32, job execution machines 41 to 43, and a calculation result file server (file database) 5 via an electric communication line such as a LAN and via network HUBs 61 and 62.

The job input file making machines 31 and 32 each are constituted by, for example, a PC (Personal Computer) or the like and create input files (files to be processed) to be inputted to an application program, processing of which are carried out by the job execution machines 41 to 43. Further, to make the job execution machines 41 to 43 process created input files, the job input file making machines 31 and 32 send those created files together with job execution commands, to the job management apparatus 1. The application program processings of which are performed by the job execution machines 41 to 43 may be an application program for structure analysis or the like.

The job execution machines 41 to 43 each are constituted by, for example, a PC (Personal Computer) or the like. The present embodiment deals with an example in which jobs are executed by plural calculators. The present invention is not limited to this example but may be arranged such that plural jobs are processed in parallel by one calculator.

The license server 2 manages how licenses are used in accordance with execution states of jobs executed by the job execution machines 41 to 43. By thus managing licenses, it is possible to know how many licenses are usable at present and how many licenses are managed in total.

The calculation result file server (file database) 5 is constituted by an HDD or the like, and functions as a database which stores data concerning results of execution of jobs by the job execution machines 41 to 43.

Figure 2:
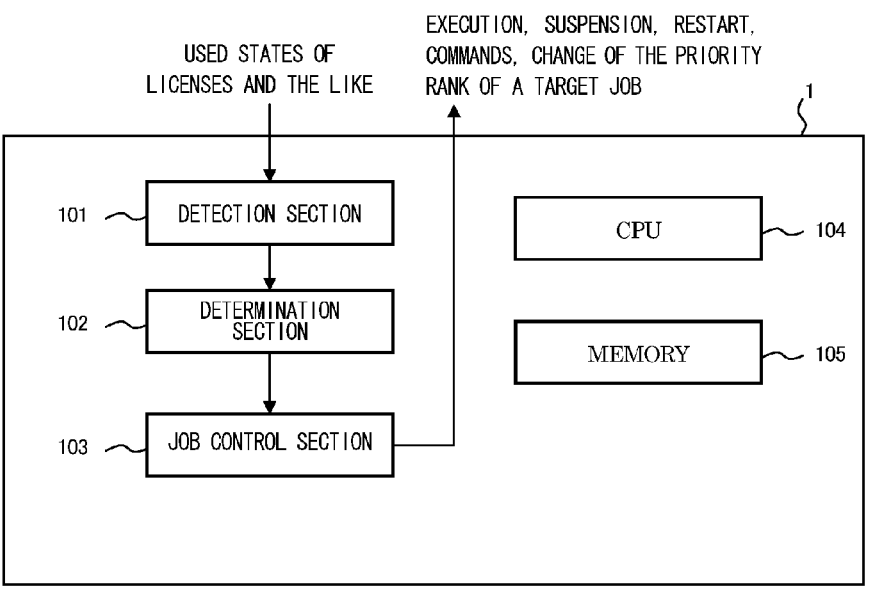
FIG. 2 is a functional block diagram to explain the job management apparatus according to the present embodiment.

FIG. 2 is a functional block diagram to explain the job management apparatus according to the present embodiment. The job management apparatus 1 is constructed in a structure having a detection section 101, a determination section 102, a job control section 103, a CPU 104, and a MEMORY 105.

The detection section 101 has a function of collecting information concerning licenses managed by the license server 2, thereby to detect the number of unused licenses, based on used states of licenses.

The determination section 102 has a function of determining whether or not the number of unused licenses detected by the detection section is sufficient to cover the number of licenses which are required for execution of a job to be executed.

The job control section 103 has functions of grasping priority ranks which have been set in advance for the job as a target to be executed, making this job be executed, suspending any other job, and restarting the job suspended. In addition, the job control section 103 is capable of monitoring a continuous run duration of a given job in each job execution machine, by means of a timer or the like. Further, the job control section 103 can recognize the priority rank of the given job, which has been set in advance, and change the priority rank based on a predetermined rule. Furthermore, the job control section 103 can change the number of CPUs to be used for execution of a given job, and so can increase or decrease the number of CPUs being used for execution of a job, upon necessity.

If the determination section determines that the number of unused licenses is not sufficient to cover the number of licenses required for execution of a job to be executed, the job control section 103 constructed in this structure functions to let the job to be executed be executed, in a manner as follows. That is, among the licenses used by jobs assigned to lower priority ranks than the priority rank set for the job to be executed, at least such a number of licenses that are equivalent to a shortage of licenses for execution of the job to be executed are set in an unused state by the job control section 103.

The CPU 104 functions to perform various processing in the job management apparatus 1. The CPU 104 also functions to realize various functions by executing programs stored in the MEMORY 105. The MEMORY 105 is constituted by, for example, a ROM or RAM, and functions to store various information and programs to be used by the job management apparatus 1.

The job management apparatus 1 according to the present embodiment carries out management of jobs being executed and to be executed, based on licenses, with use of the structure as described above.

Figure 3:
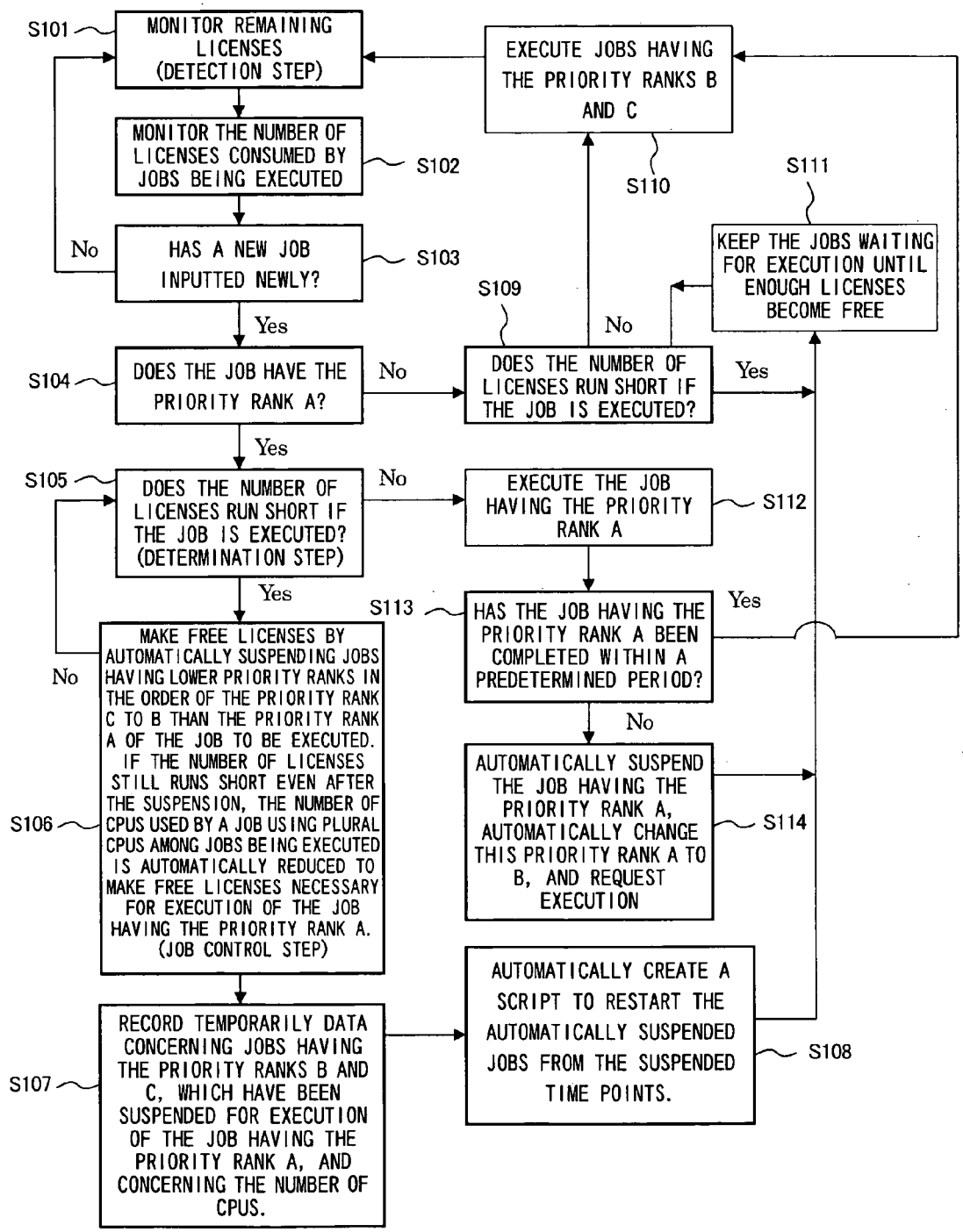
FIG. 3 is a flowchart to explain a flow of processing (job management method) in the job management apparatus according to the present embodiment.

FIG. 3 is a flowchart to explain a flow of processing (job management method) in the job management apparatus according to the present embodiment.

Firstly, the detection section 101 automatically monitors execution states (license consumption states) of jobs in the job execution machines 41 to 43, and detects the number of unused licenses, based on the used states of licenses (tokens) (detection step: S101). Each job is executed after obtaining a token from the license server 2. If no token to execute a job remains in the license server 2, the job is put in an execution queue.

More specifically, the detection section 101 calculates the number of unused licenses, as a value obtained by subtracting the number of used licenses from the number of license contracts. For example, if the number of contracted licenses is 80 (i.e., there are 80 tokens) and if jobs of 76 tokens have been being executed, the number of unused licenses is "4".

The number of used licenses (consumption of tokens) used for execution of a job varies depending on the contents of execution of the job. For example, in case of a job of carrying out static analysis, 4 tokens are consumed. In another case of a job of carrying out dynamic analysis, 5 tokens are consumed. As the number of CPUs used for execution a job is increased one by one, the number of tokens consumed is also increased one by one (e.g., 1 CPU=5 tokens consumed, 2 CPUs=6 tokens consumed, 3 CPUs=7 tokens consumed). The detection section 101 thus monitors the number of licenses used by jobs being currently executed (S102).

Subsequently, the detection section 101 monitors whether or not a new job has been inputted from the job input file making machine 31 or 32 (S103). If there is no new job inputted (S103, No), the flow returns to monitoring of the number of unused licenses.

Otherwise, if a new job has been inputted (S103, Yes), what a priority rank has been set for the new job is recognized (S104).

The priority rank set for the job can be set arbitrarily by the user (e.g., priority ranks A, B, and C having a relationship: priority rank A>priority rank B>priority rank C). Every time when a job input file is inputted to the job management apparatus 1 from a job input file making machine, a priority rank is inputted together with the job input file.

The number of CPUs used by a job, a priority rank which has been set, and the type of the job (static analysis or dynamic analysis) can be determined from a command line inputted to the job management apparatus 1. The number of licenses consumed by the inputted job can be determined from the contents of the inputted command line. The present embodiment is arranged such that jobs which have no priority rank set are not executed.

More specifically, an example of a job having a high priority rank (e.g., a job with the priority rank A) will be a job to perform an error check or an easy test calculation, as a preparation for another job scheduled to be carried out later. Many of jobs of this kind are completed generally in a short time period. Therefore, waiting time before execution of jobs of this kind needs to be shortened, from the viewpoint of work efficiency. The priority ranks as described above can be set by NICE values (e.g., the priority rank A is expressed by a NICE value "55", B by "50", as well as C by "45"). In the present embodiment, it is supposed that jobs with the priority ranks A, B, and C respectively consume 12 tokens, 5 tokens, and 4 tokens.

If the priority rank set for a newly inputted job is A (S104, Yes), the determination section 102 determines whether or not the number of unused licenses detected in the detection step is sufficient to cover the number of licenses necessary for execution of the job (with the priority rank A) to be executed (determination step: S105).

For example, if one job having the priority rank A has been inputted, 12 tokens are consumed. However, if the number of unused licenses (i.e., the number of unused tokens) is "4" as described above, the job cannot be executed without more 8 tokens (i.e., the number of unused licenses is not sufficient to cover the number of licenses necessary for execution of the job to be executed) (S105, Yes).

In this case, among the licenses (or tokens) used by a job assigned to a lower priority rank (B or C) than the priority rank (A) set for the job to be executed, at least such a number of licenses (8 tokens in this example) that are equivalent to a shortage of licenses for execution of the job to be executed are set in an unused state by the job control section 103 (job control step: S106).

In this case, the job control section 103 sets licenses in an unused state, by suspending execution of the job assigned to a lower priority rank (B or C) than the priority rank set for the job to be executed. Therefore, the job inputted last among jobs having the priority rank C and being currently executed is suspended so that licenses of 4 tokens are set in an unused state, thereby enabling execution of the job to be executed, which has the priority rank A.

If there is a large number of licenses consumed by a newly inputted job and if a necessary number of licenses cannot be obtained by merely suspending the job having the priority rank C, another job having the priority rank B is suspended. If a necessary number of licenses cannot be obtained even by suspending all of the jobs having the priority ranks B and C, the number of CPUs used by a job having the priority rank A, which uses plural CPUs, is reduced automatically to obtain enough number of licenses.

There is a case that a shortage of licenses is not so great as to necessitate suspension of a job, e.g., the shortage is only "1" license. In this case, if a job for which a lower priority rank (B or C) has been set than the priority rank set for the job to be executed uses plural CPUs, the number of CPUs used by the job can be reduced to set a license in an unused state.

The job control section 103 stores, into the MEMORY 105, information of a job suspended to execute the newly inputted job having the priority rank A and information of a job for which the number of CPUs is reduced, as described above (S107).

Thereafter, a script for reexecuting those suspended jobs from suspended time points is automatically generated (S108), and the job control section 103 waits until a number of licenses necessary to enable execution of those suspended jobs become free (S109, S111).

If the job to be executed is completed and a number of licenses sufficient to execute the suspended jobs become free, the job control section 103 restarts execution of these suspended jobs (S110).

Otherwise, if a number of licenses necessary to execute the newly added job having the priority rank A are free (S105, No), the job control section 103 makes the newly inputted job be executed (S112).

Further, if a job for which a predetermined priority rank (for example, A) has been set is being executed continuously for a predetermined time period or more, the job control section 103 suspends execution of this job and changes the priority rank of this job to a lower priority rank (for example, B), thereby to set this job in an execution waiting state (S113, S114). In this manner, it is possible to restrict frequent use of the priority rank A for jobs which the user do not request to be done urgently.

Each of steps of the above processing (job management method) in the job management apparatus 1 is realized by making the CPU 104 execute a job management program stored in the MEMORY 105.

Note that the job management program described above can be executed by a computer which constitutes a communication terminal and a communication control device, by storing the program into a recording medium readable from a computer. The scope meant by a recording medium readable from a computer may include a portable storage medium such as a CD-ROM, flexible disk, DVD, magneto-optical disk, or a semiconductor storage device in an IC card, a fixed storage device such as a ROM or RAM built in a computer, or a magnetic storage device, a database which maintains a computer program, another computer and a database thereof.

The present embodiment has been described with reference to a case that different jobs (e.g., commands of a commercial application program) are respectively executed by plural calculators. The present invention is not limited to this example but may be applied to another case that different kinds of plural jobs are executed by one calculator.

If a processing load to any of the job execution machines 41 to 43 becomes 95% or more, a job having a low priority rank may be suspended thereby to reduce the processing load to the job execution machine. Thereafter, a job having a high priority rank may be inputted. This contributes to improvement in processing efficiency of execution of jobs (particularly, execution of a job having a high priority rank) by the job execution machines.

As described above, according to the present embodiment, a prioritized inputted job can be executed quickly by additionally inputting a priority rank to a command line in accordance with a rule which has been set up, even in a situation that jobs for which the number of licenses is managed by a license server of a commercial application program or the like concentrate at one time, causing a shortage of licenses. As a result of this, it is possible to avoid waste of processing capability, e.g., a job becomes inexecutable because a shortage in number of licenses occurs although enough processing capability still remains in the side of calculators.

The present invention has been described in details above with reference to a specific embodiment. However, it is apparent to those skilled in the art that various modifications and improvements would readily occur without deviating from the sprit and scope of the present invention.

What is claimed is:

1. A job management apparatus comprising:
a computer processor,
wherein the computer processor is programmed to function as:
a detection section that detects a number of unused licenses;
a determination section that determines whether or not the number of unused licenses detected by the detection section is sufficient to cover a number of licenses necessary for execution of a first job to be executed, wherein the first job includes a number of central processing units (CPUs) to execute the first job, a priority rank assigned to the first job, and a type of job assigned to the first job, the type of the first job includes any one of a static analysis job and a dynamic analysis job, wherein the number of licenses necessary for execution of the first job being determined based on the number of CPUs to execute the first job and the type of the first job;
a job control section that sets a used license that is used by a second job into an unused state, in which a priority rank assigned to the second job is lower than the priority rank assigned to the first job, when the determination section determines that the number of unused licenses is not sufficient to cover the number of licenses necessary for execution of the first job to be executed, said job control section allocates the used license being set into the unused state from the second job to the first job; and
wherein, when the first job is kept executed continuously for a predetermined time period or more, the job control section suspends execution of the first job, changes the predetermined priority rank assigned to the first job to a lower priority rank, sets the first job into an execution waiting state, and allows another job to execute.

2. The job management apparatus according to claim 1, wherein the job control section suspends execution of the second job to set the used license into the unused state.

3. The job management apparatus according to claim 2, wherein the job control section restarts execution of the second job after execution of the first job is completed.

4. The job management apparatus according to claim 1, wherein when number of CPUs to execute the second job is assigned to the second job and the number of CPUs to execute the second job is plural, the job control section sets the used license into the unused state by reducing the number of CPUs to execute the second job.

5. The job management apparatus according to claim 1, wherein the job control section sets at least one additional used license used by the second job into the unused state so that a number of used licenses set into the unused state is equal to the number of licenses necessary for execution of the first job.

6. A job management method comprising:
detecting a number of unused licenses;
determining whether or not the number of unused licenses detected by the detecting is sufficient to cover a number of licenses necessary for execution of a first job to be executed, wherein the first job includes a number of central processing units (CPUs) to execute the first job, a priority rank assigned to the first job, and a type of job being assigned to the first job, the type of the first job includes any one of a static analysis job and a dynamic analysis job, wherein the number of licenses necessary for execution of the first job being determined based on the number of CPUs to execute the first job and the type of the first job;

setting a used license that is used by a second job into an unused state, in which a priority rank assigned to the second job is lower than the priority rank assigned to the first job, when the determining determines that the number of unused licenses is not sufficient to cover the number of licenses necessary for execution of the first job, allocating the used license being set into the unused state from the second job to the first job; and wherein, when the first job is kept executed continuously for a predetermined time period or more, suspending execution of the first job, changing the predetermined priority rank assigned to the first job to a lower priority rank, setting the first job into an execution waiting state, and allowing another job to execute.

7. The job management method according to claim 6, wherein the setting suspends execution of the second job to set the used license into the unused state.

8. The job management method according to claim 7, wherein the setting restarts execution of the second job after execution of the first job is completed.

9. The job management method according to claim 6, wherein when a number of CPUs of to execute the second job is assigned to the second job and the number of CPUs to execute the second job is plural, the setting sets the used license into the unused state by reducing the number of CPUs to execute the second job.

10. The job management method according to claim 6, wherein the setting sets at least one additional used license used by the second job into the unused state so that a number of used licenses set into the unused state is equal to the number of licenses necessary for execution of the first job.

11. A non-transitory storage medium that has stored therein, readable by a computer, a job management program that causes the computer to execute a process comprising:
   detecting a number of unused licenses;
   determining whether or not the number of unused licenses detected by the detecting is sufficient to cover a number of licenses necessary for execution of a first job to be executed, wherein the first job includes a number of central processing units (CPUs) to execute the first job, a priority rank assigned to the first job, and a type of job being assigned to the first job, the type of the first job includes any one of a static analysis job and a dynamic analysis job, wherein the number of licenses necessary for execution of the first job being determined based on the number of CPUs to execute the first job and the type of the first job;
   setting a used license that is used by a second job into an unused state, in which a priority rank assigned to the second job is lower than the priority rank assigned to the first job, when the determining determines that the number of unused licenses is not sufficient to cover the number of licenses necessary for execution of the first job, allocating the used license being set into the unused state from the second job to the first job; and wherein, when the first job is kept executed continuously for a predetermined time period or more, suspending execution of the first job, changing the predetermined priority rank assigned to the first job to a lower priority rank, setting the first job into an execution waiting state, and allowing another job to execute.

12. The non-transitory storage medium according to claim 11, wherein the setting suspends execution of the second job to set the used license into the unused state.

13. The non-transitory storage medium according to claim 12, wherein the setting restarts execution of the second job after execution of the first job is completed.

14. The non-transitory storage medium according to claim 11, wherein when a number of CPUs to execute the second job is assigned to the second job and the number of CPUs to execute the second job is plural, the setting sets the used license into the unused state by reducing the number of CPUs to execute the second job.

* * * * *